Jan. 27, 1959 J. M. SHAPIRO 2,871,349

DISCRIMINATOR CIRCUIT

Filed July 14, 1954 2 Sheets-Sheet 1

INVENTOR.
JONAS M. SHAPIRO
BY Alfred E. Miller
ATTORNEY

INVENTOR.
JONAS H. SHAPIRO
BY Alfred E. Miller
ATTORNEY 2,871,349
Patented Jan. 27, 1959

2,871,349

DISCRIMINATOR CIRCUIT

Jonas M. Shapiro, Yonkers, N. Y.

Application July 14, 1954, Serial No. 443,247
3 Claims. (Cl. 250—27)

This invention relates to discriminators for amplitude-modulated and frequency- or phase-modulated signals, and, in particular, to discriminator circuits producing an output voltage having a polarity and magnitude dependent upon the deviation in frequency or phase of an input signal from a reference frequency.

Radio receivers for audio-modulated waves are frequently troubled with the phenomena known as "drift," which involves a shift in frequency of the local oscillator due to a change in temperature or humidity of its environment. A popular arrangement for avoiding this trouble is to employ an automatic frequency control circuit (A. F. C.). One such circuit employs a Foster-Seely type discriminator coupled to the output of the I. F. strip, and feeding back a voltage to a reactance-tube-controlled local oscillator, whereby a shift in frequency of the local oscillator from the correct value will produce a D. C. voltage from the discriminator of such magnitude and polarity that when applied to the control grid of the reactance tube will cause the local oscillator to return to the correct operating frequency.

Such discriminator circuits usually employ an input circuit tuned to a reference or center frequency of the preceding I. F. strip, i. e., the I. F. carrier frequency, and operation of the circuit results from the input frequency departing from that standard I. F. frequency. Inasmuch as such input circuits contain inductance and capacitance elements, whose values also depend on the existing temperature and moisture environment, variations in the latter conditions cause frequency changes in the tuned input circuit with the consequence that the local oscillator is caused to shift its frequency from the correct value, i. e., the receiver drifts from the correct frequency.

Even the provision of this automatic frequency control circuit fails to completely overcome the above drawback for the reason that in the known arrangements, proper operation is predicated on a correctly-tuned input circuit to the discriminator. Another drawback of the known discriminator circuits combined with A. F. C. is that they do not maintain the local oscillator at the exact correct frequency. For certain applications, it is required that the oscillator be tuned to the exact correct frequency. This cannot be attained by the aforedescribed known circuits.

One object of the present invention is to provide a discriminator circuit which is insensitive to changes in the temperature or humidity of the surrounding environment.

Another object of the present invention is to provide a discriminator circuit which, in conjunction with an associated A. F. C. circuit, is capable of maintaining the operating frequency of a local oscillator to within a fraction of a cycle of the correct value even at frequencies as high as 100 mc.

A still further object of the invention is the provision of an all-electronic discriminator circuit for amplitude-modulated and frequency- or phase-modulated waves which will automatically pull in and hold a local oscillator to within 10 degrees of one cycle of the correct frequency, which feature is substantially independent of tuning as well as of temperature and humidity conditions.

These and other objects of the invention will be best understood from the following description.

In accordance with the invention, the discriminator circuit comprises a tuned input circuit arranged to produce a pair of signal voltages 180° out-of-phase with each other in addition to a 90° quadrature voltage when a signal is applied to that circuit. Means are also provided for injecting into that input circuit a second pair of signal voltages 180° out-of-phase with each other. This second pair of signal voltages is derived from a controlled-frequency source either fixed or varying, serving as a reference frequency, which signal voltages are at the exact, desired frequency. The two groups of voltages together with the quadrature voltage are applied to an arrangement for measuring the phase relationships thereof, and which produces a D. C. voltage whose polarity and magnitude are dependent on how far the applied signal deviates in frequency and/or phase from the desired reference frequency.

The arrangement described functions as a source of a control voltage useful in an A. F. C. circuit. It has the advantage over the known arrangements, however, that it has the ability of automatically pulling in a controlled local oscillator and locking it to within a fraction of a cycle of the frequency of the controlled-frequency source or reference. Moreover, this locking arrangement is still effective even though the input circuit of the arrangement becomes detuned off the correct I. F. frequency due to temperature or humidity changes.

The invention will now be described in connection with the accompanying drawing, in which.

Figure 3:
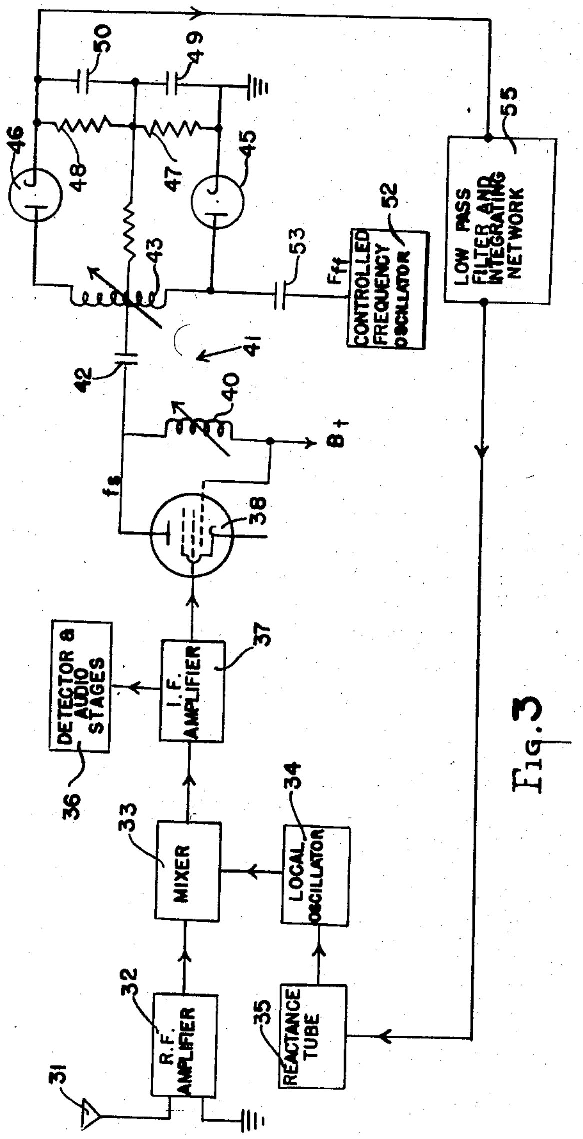
Figure 4:
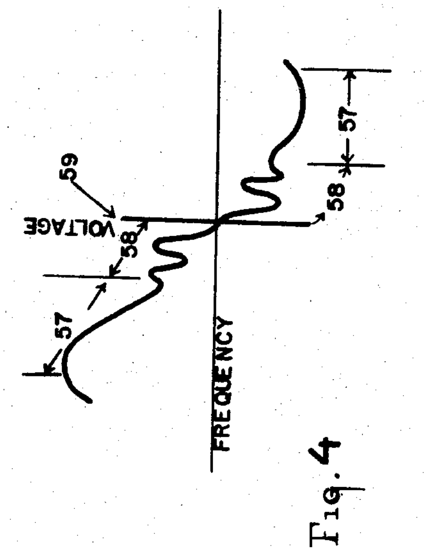

Fig. 3 is a partially-block, partially-detailed schematic circuit illustrating one form of discriminator circuit of the invention employed in an A. F. C. circuit;

Fig. 4 is a graph illustrating operation of the circuit of Fig. 3, and

Figures 1, 2, 5:
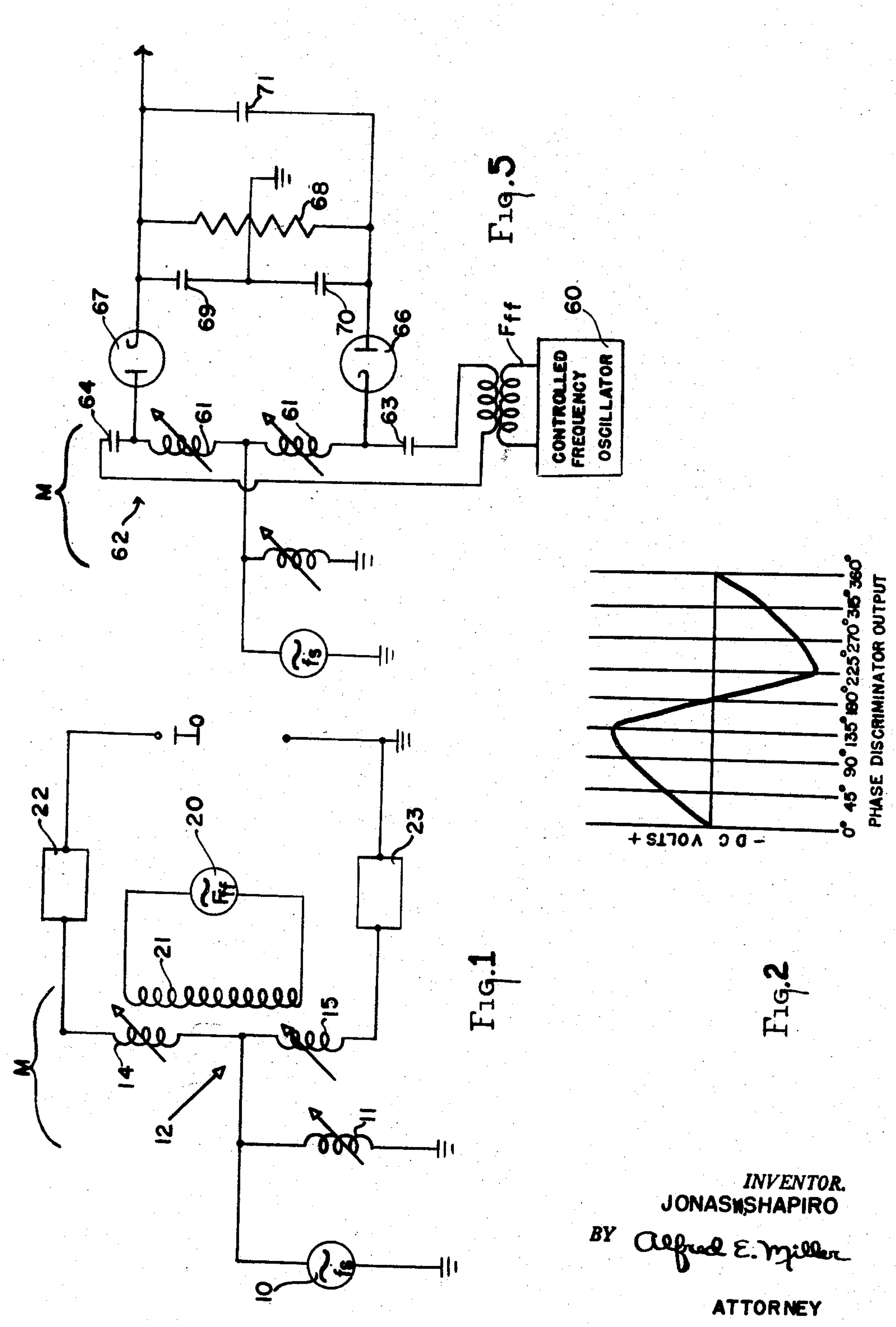
Fig. 1 is a schematic circuit broadly illustrating the concepts underlying the present invention.
Fig. 2 is a graph of D. C. output voltage vs. phase differences between the two applied signals of the circuit shown in Fig. 1.

Fig. 5 is another form of discriminator arrangement in accordance with the invention.

Referring now to Fig. 1, a source 10 of signal voltages supplies a signal *fs* to a tuned input circuit constituted by a primary winding 11 of a transformer referred to generally by the numeral 12. The same signal *fs* is also directly applied to the midpoint of a secondary winding of the transformer 12 which is constituted by an upper section 14 and a lower section 15 both magnetically coupled to the primary winding 11. Consequently, across that secondary winding there will appear a pair of voltages 180° out-of-phase with one another and another voltage in quadrature therewith. The arrows through the primary and secondary windings denote tuned circuits which are obtained in the usual manner by the provision of suitable capacitors (not shown). A second source 20 of signal potential is also present. The latter, which may be designated as the reference or a controlled-frequency source for example, a crystal-controlled oscillator, operates at a predetermined fixed frequency which may be fixed or variable. The signal $F_{ff}$ from that source is developed across another winding 21 of the transformer 12, thus producing a second pair of voltages across the secondary winding 14, 15 which are also 180° out-of-phase with one another, but at the reference frequency. A pair of rectifying devices 22, 23 may be employed to analyze the interrelationships between the voltages present across the secondary winding 14, 15.

The output current Io of the aforedescribed circuit depends upon the frequency and phase relationships between the two signals $fs$ and $F_{ff}$. When $fs$ and $F_{ff}$ are at the exact same frequency and correctly phased with one another, the D. C. output from the circuit is zero. That is to say, the circuit is in a balanced condition. When $fs$ leaves phase with $F_{ff}$, a D. C. voltage will appear at the output of the circuit whose polarity and magnitude will depend upon the extent of the phase deviation, which voltage can serve in an A. F. C. circuit to shift the phase of the signal $fs$ until it again is in phase with $F_{ff}$. In fact, a deviation as small as 1° of phase difference between the two signals will produce a correcting voltage for the source 10 producing the signal $fs$.

Fig. 2 is a graph showing the D. C. output of the circuit as the phase difference between the two signals varies. It should be noted that the slope of the characteristic at the 180° position (zero voltage) is extremely high, thereby indicating that even small phase differences will produce a relatively large signal.

Fig. 3 shows one form of discriminator circuit in accordance with the invention employed, for example, in the central circuit of an A. M. receiver. In such receivers, the signal is received by an antenna 31, amplified by a R. F. amplifier stage 32 and applied to the input circuit of a conventional mixer 33, to which is also applied a signal emanating from a local oscillator 34. The frequency of the local oscillator is controlled by a reactance tube 35 in the well-known manner, the applied signal to the grid of the reactance tube being the conventional way of controlling the reactance supplied by the latter to the resonant circuit of the local oscillator.

The two signals at the mixer 33 are heterodyned, and the difference frequency applied to one or a series of I. F. amplifier stages 37, the output of the I. F. amplifier is then applied to the usual detecting and audio stages 36. For correct operation, the local oscillator must produce a frequency such that the output frequency from the mixer is exactly the frequency to which the I. F. amplifiers are tuned, i. e., the I. F. carrier or reference frequency.

A portion of the output signal derived from the I. F. amplifier is also fed to a limiter stage 38, shown as a pentode tube, and the signal derived from the plate of that tube 38 is developed across a tuned output circuit constituted by a primary winding 40 of a transformer referred to generally by the numeral 41 and an associated capacitor 72. The same signal is also directly coupled by way of a capacitor 42 to the center tap of a secondary winding 43 of the same transformer 41, which secondary winding also forms part of a tuned circuit. The tuned circuit of the secondary winding is composed of an L and C feeding the rectifying elements 45 and 46 in shunt separated by a small capacitor 73 and another L and C tuned circuit which feeds the injection frequency. Both tuned circuits of this stage are tuned to the center or mean frequency of the I. F. carrier. Connected to opposite ends of the secondary winding are a pair of rectifying tubes or elements 45, 46, the cathodes of which are connected in series across a pair of resistors 47, 48 shunted by a pair of condensers 49, 50. The junctions of the resistors and capacitors are connected together, and by way of a resistor 51 to the center of the secondary winding 43.

A reference controlled-frequency source 52, for example, a crystal-controlled oscillator, is connected by way of a coupling capacitor to the junction of the secondary winding 43 and the plate of the rectifier 45. The frequency of the signal emanating from the controlled frequency source, which may be its fundamental or a suitable harmonic, is chosen so that the signal supplied to the circuit is at the exact I. F. frequency. The transformer circuit 41 provides the first pair of 180° out-of-phase voltages and the quadrature voltage from the signal $fs$ derived from the limiter stage 38, whereas, the controlled-frequency source 52 supplies the second pair of 180° out-of-phase voltages at the reference frequency $F_{ff}$ by autotransformer action. An output signal from this stage is fed back to the grid of the reactance tube 35 through a low pass filter and integrating network 55, whose function will be described hereinafter. The low pass filter is preferably chosen to exhibit the characteristic of transmitting the highest possible A. C. frequency at which the system remains stable, that is, does not break into oscillation.

The circuit described in Fig. 3 operates in the following manner. In the absence of the fixed frequency source 52, the circuit operates as a conventional A. F. C. circuit in which frequency deviations of the amplitude-modulated signal from the I. F. frequency produces a D. C. voltage at the output thereof. As the frequency of the signal $fs$ shifts either side of the I. F. center frequency, an average D. C. voltage is produced whose polarity is such that it corrects the frequency that caused the D. C. voltage to appear.

However, the injection into the circuit of a pair of voltages 180° out-of-phase with one another at a reference frequency acts analogously to a phase lock, and forces the local oscillator to lock to within a few degrees of one cycle of that reference frequency. In other words, the D. C. signal level derived from the output of that circuit will have such a polarity and magnitude as to force the local oscillator into exact synchronism with that of the controlled frequency source. If, for example, the local oscillator frequency should vary, the discriminator circuit of the invention would produce a signal ($fs-F_{ff}$) which, when applied to the reactance tube, would cause the local oscillator to sweep through a frequency spectrum which includes the reference frequency $F_{ff}$. However, as the local oscillator passes that frequency, the injected reference frequency-voltage will lock it into synchronism with itself to within a fraction of a cycle.

The function served by the low pass filter 55 is to stabilize the system. Such A. F. C. systems, which include a feedback loop, tend to break into oscillation unless means are provided to limit the highest frequency fed back to the local oscillator. As a consequence, conflicting requirements must be met. Higher frequencies of the control voltage applied to the reactance tube controlling the local oscillator decrease the response time of the system, that is to say, the local oscillator is locked into synchronism with the reference frequency more rapidly. However, these higher frequencies increase the tendency of the entire system as a whole to become unstable. Consequently, the cut-off frequency of the low pass filter is preferably chosen as high as possible in order to minimize the response time of the locking action, but low enough to maintain the system stabilized.

One such system produced by the inventor employed a cut-off frequency of the low pass filter of 200 C. P. S. However, the inventor does not intend to limit himself to this value as will be evident from the preceding discussion.

To further clarify this point, if $fs-F_{ff}$ is above the cutoff frequency of the low pass filter, the action of the latter will prevent any A. C. signals from being applied to the grid of the reactance tube. In such a case, the ordinary discriminator action of the circuit operates to produce a D. C. voltage that drives back the local oscillator below the low pass filter cutoff frequency. When this occurs, the low pass filter then allows A. C. signals to be fed to the reactance tube which in turn causes the local oscillator to rapidly sweep through the phase lock frequency, at which time a large phase lock voltage is produced, the corrective sequence of actions broken and the oscillator locked in at that frequency, whereby the condition that is reached is that of $fs-F_{ff}=0$.

Fig. 4 graphically illustrates this operation of the circuit. The abscissa of the curve shown therein represents frequency, and the ordinate, the output voltage produced by the discriminator circuit of Fig. 3. The portion of the curve indicated by reference numeral 57 represents the effect of the discriminator portion of the circuit, which produces a voltage tending to drive the local oscillator below the low pass filter cutoff frequency. The low pass filter then transmits an A. C. signal to the reactance tube, shown by the portion of the curve having the reference numeral 58, which causes the latter to drive the local oscillator rapidly toward the frequency $F_{ff}$. When that frequency is reached, a large phase lock voltage 59 is produced which holds in the oscillator at the correct frequency and exactly in phase with the fixed frequency $F_{ff}$. Moreover, this synchronizing effect will occur even though the input circuit of the discriminator, constituted by the tuned circuits of the primary and secondary windings of the transformer 41, become detuned due to fluctuations in value of the parameters of the circuit, which is not the case with the known discriminator circuits.

The controlled frequency source may be either fixed or varying in operation. It should produce a signal whose amplitude is an appreciable percentage of the signal derived from the limiter stage 38. It is preferably maintained as low as possible while still obtaining the desired operation in order to minimize radiation. In one circuit, a ratio of 5:1 between the signal *fs* and the reference frequency $F_{ff}$ was found satisfactory.

In addition, though the discriminator circuit of the invention has been described in connection with a reactance-tube-controlled local oscillator, it will be evident to those skilled in the art that any other type of controlled oscillator circuit will work equally well, so long as it will respond to variations in the D. C. level of the signal derived from the discriminator. Exampes of other of such circuits are: voltage-sensitive capacitor controlled oscillators; variable-permeability transformers with D. C. current flow such as "Incruductors"; directly-controlled oscillators by D. C. bias changes, etc.

Moreover, injection of the reference frequency signal need not be in the manner illustrated in Fig. 3. For example, Fig. 5 illustrates another embodiment of the discriminator circuit of the invention employing a so-called ratio detector. In this case, the injected signal from the controlled frequency source 60 is in a push-pull arrangement at opposite ends of the secondary winding 61 of a transformer 62, coupling occurring by way of coupling capacitors 63, 64. However, as indicated previously, the position of the circuit at which the voltages from the controlled frequency source are injected is not material, provided, however, that a pair of voltages at the reference frequency which are 180° out-of-phase with each other are produced in the circuit.

In the circuit of Fig. 5, the first pair of voltages 180° out-of-phase produced from the signal *fs* and the quadrature voltage, together with the injected signals, are applied to series-connected diodes 66, 67, across which are connected a center-tapped, grounded resistor 68, a pair of shunting capacitors 69, 70, and a large electrolytic condenser 71. The total D. C. voltage across the capacitors 69, 70 is a function of the average signal amplitude. Any change of output of either diode, caused by a shift in frequency of the applied signal *fs* will cause the ratio of the voltages across the capacitors 69, 70 to change, but will not change their sum. Thus, the circuit output is proportional to the ratio of I. F. voltages on the diodes. The resultant signal can now be applied to a reactance tube, for example, to control the frequency of the local oscillator in the manner hereinbefore disclosed.

Another important application of the discriminator circuit is as a modulator in, for example, a radio teletype or facsimile exciter arrangement. In this case, the source of the reference frequency, instead of being a fixed frequency source, is a modulator circuit, i. e., a source of varying frequency producing intelligence-containing signals; hence a variable frequency is injected as the reference frequency into the discriminator circuit in the same manner as the fixed frequency described in connection with Fig. 3. The consequence of this arrangement is to cause the controlled variable frequency oscillator 34 to change its frequency in accordance with the injected reference frequency. Thus, the variable frequency oscillator 34 will be frequency modulated in accordance with the injected signal. The output of the variable frequency oscillator may then serve as the frequency modulated signal to transmit the desired intelligence.

The discriminator circuit of the invention offers advantages over the heretofore known arrangements. In the first place, it provides a circuit which will automatically lock the local oscillator to the exact desired frequency substantially independent of circuit tuning, as well as of temperature and humidity. Moreover, it eliminates the critically previously required in connection with the values of the L and C components which constitute the input circuit of the discriminator. These values are no longer critical inasmuch as they no longer control the magnitude of the output signal, which function is now performed by the controlled frequency source. In addition it features automatic pull-in in an all-electronic circuit arrangement.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A discriminator circuit comprising a first source of signals, a transformer having a primary winding and a center-tapped secondary winding magnetically coupled thereto, said primary winding being coupled to said first source and one side of said primary winding being connected to the center of said secondary winding, a pair of rectifiers each coupled at one side to one end of said secondary winding, an impedance connecting together the other sides of said rectifiers and the center of said secondary winding, a crystal-controlled oscillator, means coupling said oscillator to a point in said circuit between said secondary winding and the plate of one of said rectifiers to produce therein a pair of 180° out-of-phase voltages, and means coupled to said impedance to derive an output signal therefrom.

2. A discriminator circuit as set forth in claim 1 wherein the oscillator is coupled adjacent to only one end of said secondary winding, and further comprising a resistor connected at one end between said impedance and at the other end to the center of said secondary winding.

3. A discriminator circuit comprising a source of signals, a first frequency, an input circuit tuned to a reference frequency and coupled to said source, said input circuit comprising a transformer having a primary winding and a center-tapped secondary winding directly and magnetically coupled to said primary winding, a pair of balanced circuits each coupled to one half of said secondary winding, each of said balanced circuits comprising a rectifier and an impedance, a crystal-controlled local oscillator producing a signal at said reference frequency, means capacitatively coupling said oscillator to a point in said circuit between said secondary winding and the plate of one of said rectifiers to produce therein a pair of 180° out-of-phase voltages, and means coupled to said balanced circuits for deriving therefrom an output signal whose magnitude depends on the difference in frequency phase between said first frequency and said reference frequency.

(References on following page)

References Cited in the file of this patent

UNITED STATES PATENTS

| | | |
|---|---|---|
| 1,917,395 | Runge | July 11, 1933 |
| 2,476,804 | Boykin | July 19, 1949 |
| 2,496,063 | Mural | Jan. 31, 1950 |
| 2,539,818 | Dome | Jan. 30, 1951 |
| 2,543,256 | Petterson | Feb. 27, 1951 |
| 2,561,088 | Anderson | July 17, 1951 |
| 2,589,387 | Hugenholtz | Mar. 18, 1952 |
| 2,595,608 | Robinson et al. | May 6, 1952 |
| 2,605,425 | Hugenholtz | July 29, 1952 |
| 2,617,985 | Collins | Nov. 11, 1952 |
| 2,623,177 | Hugenholtz | Dec. 23, 1952 |
| 2,662,181 | Hugenholtz | Dec. 8, 1953 |
| 2,682,606 | Keizer | June 29, 1954 |
| 2,774,038 | Stavis | Dec. 11, 1956 |